March 13, 1956 O. W. RUPPEL 2,737,886
MEANS FOR INKING A SPARK PLUG INSULATOR
OR SIMILAR WARE DECORATING MEANS
Filed March 2, 1953 7 Sheets-Sheet 2

INVENTOR.
Oscar W. Ruppel
BY
ATTORNEYS

March 13, 1956  O. W. RUPPEL  2,737,886
MEANS FOR INKING A SPARK PLUG INSULATOR
OR SIMILAR WARE DECORATING MEANS
Filed March 2, 1953  7 Sheets-Sheet 3
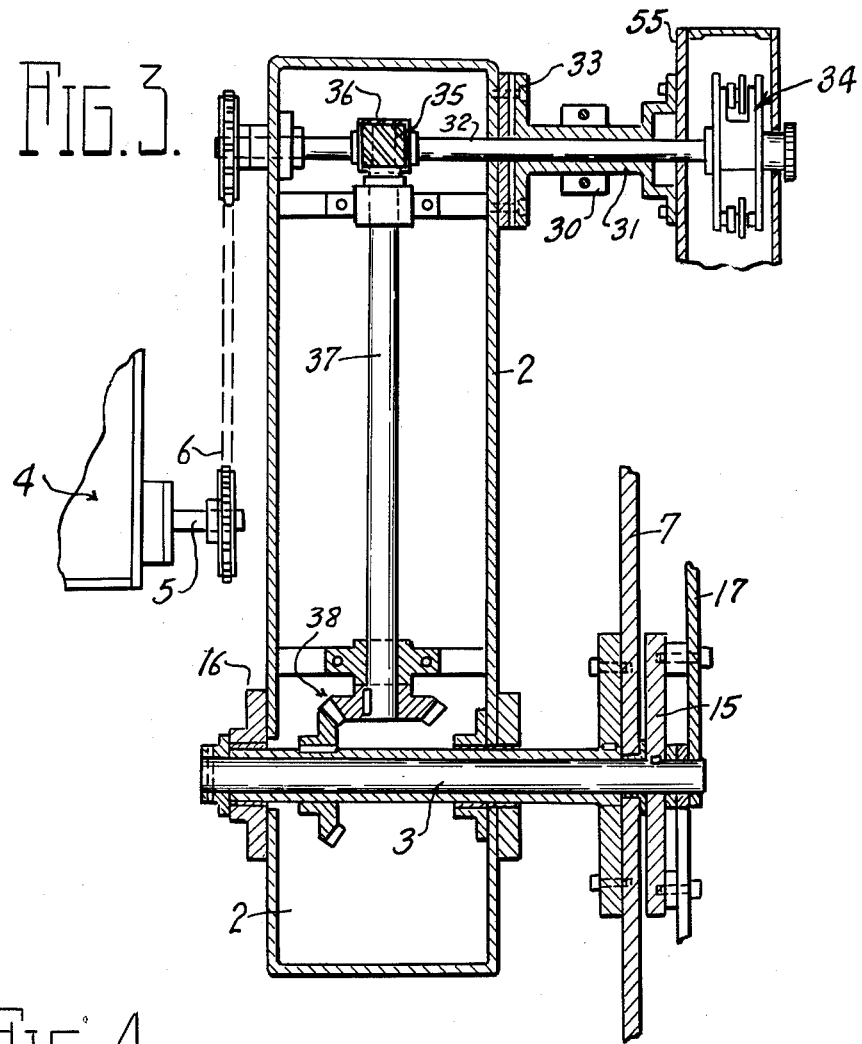
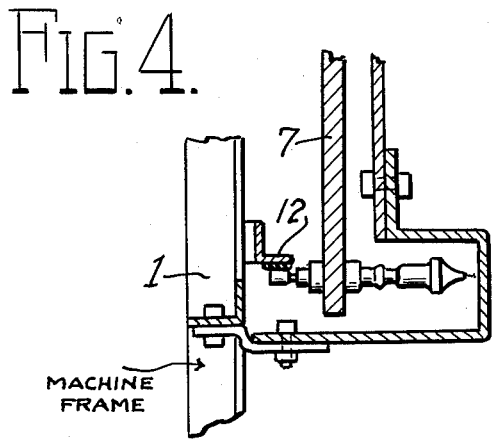
INVENTOR.
Oscar W. Ruppel
BY
ATTORNEYS

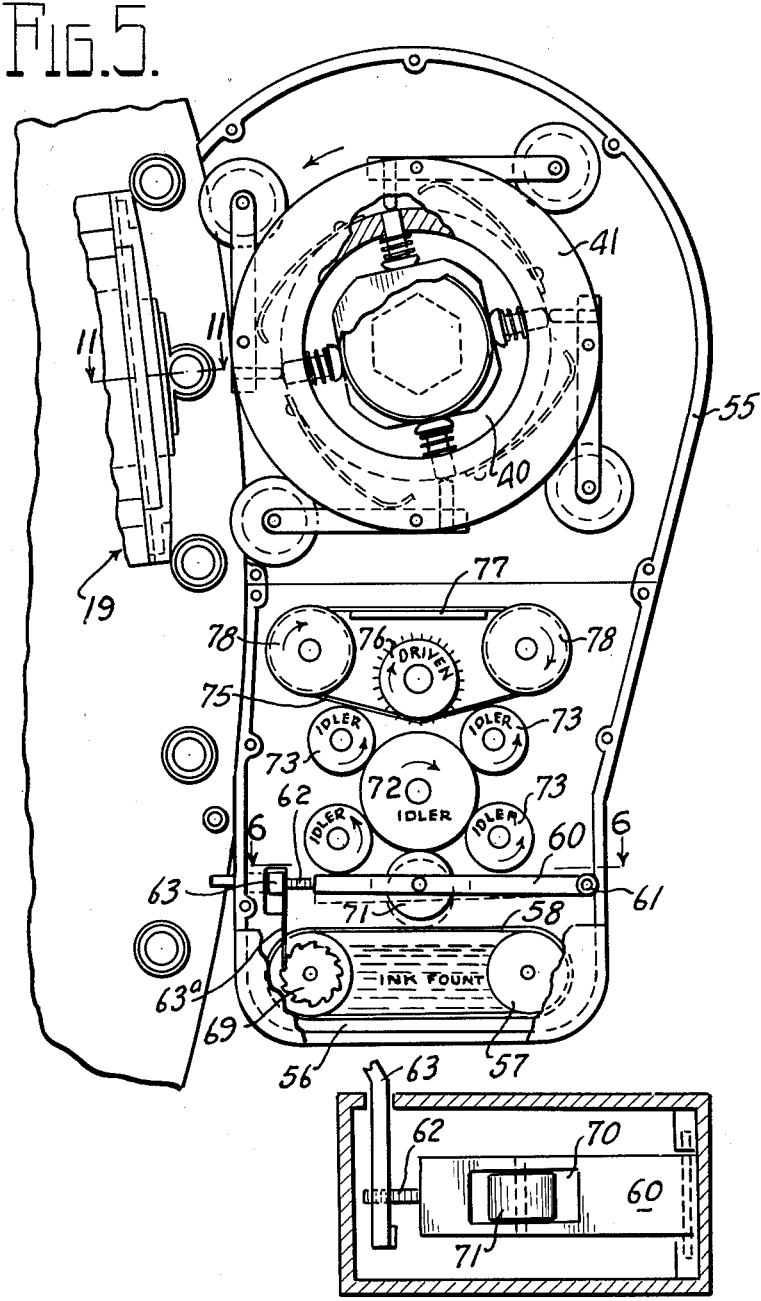

March 13, 1956  O. W. RUPPEL  2,737,886
MEANS FOR INKING A SPARK PLUG INSULATOR
OR SIMILAR WARE DECORATING MEANS
Filed March 2, 1953  7 Sheets-Sheet 5

INVENTOR.
Oscar W. Ruppel
BY
ATTORNEYS

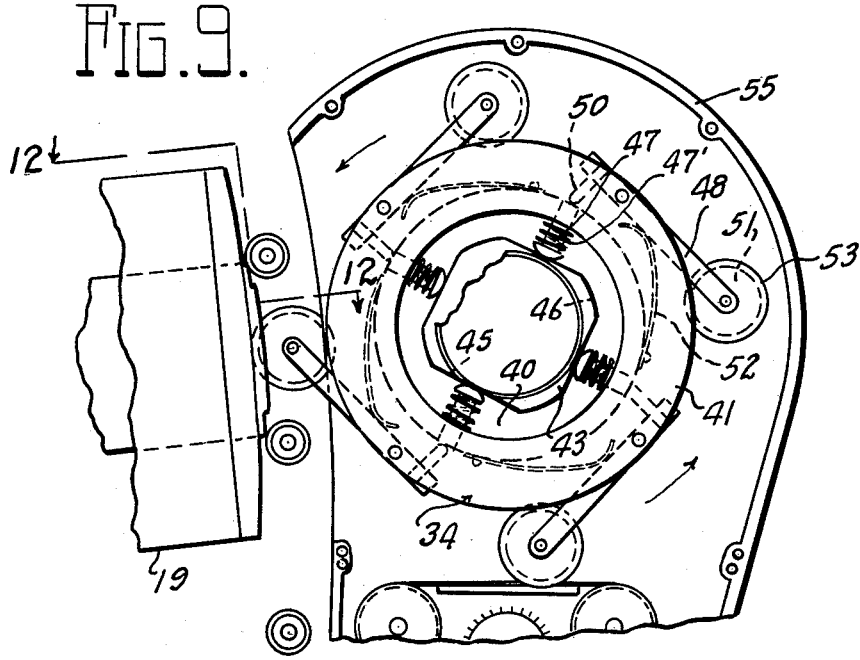
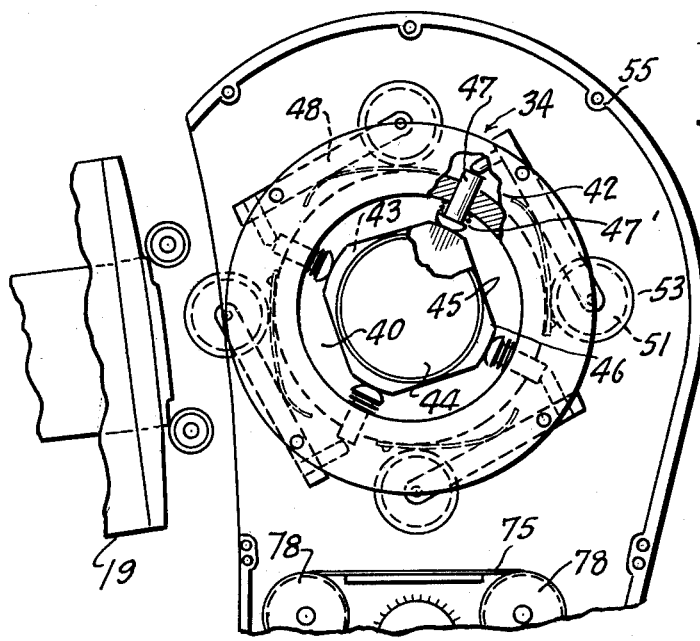

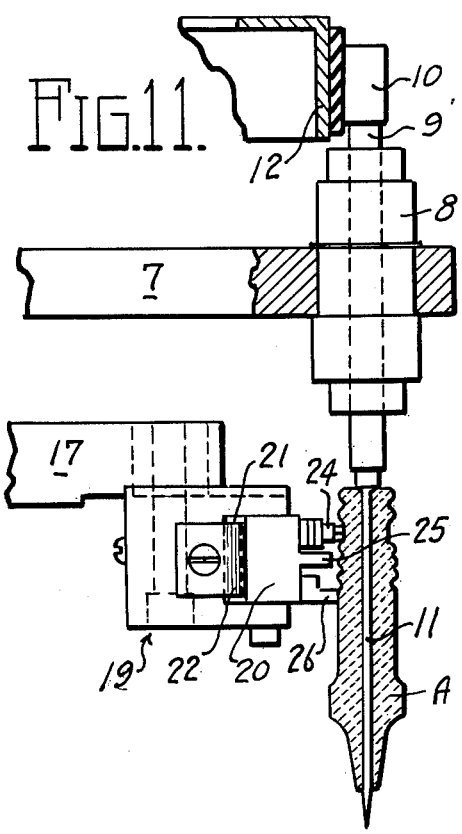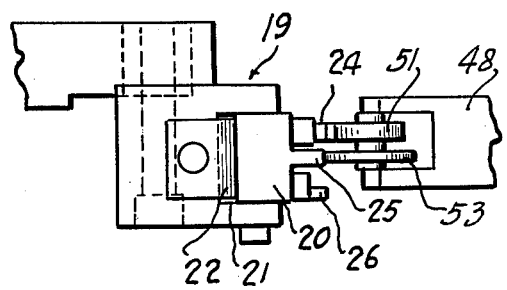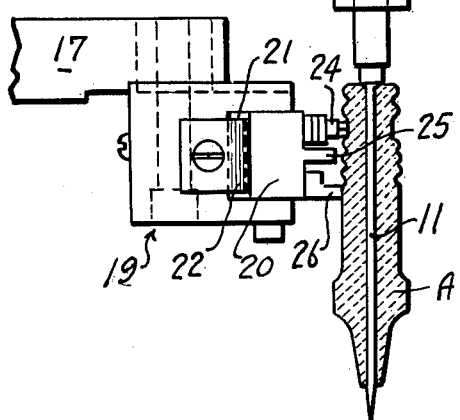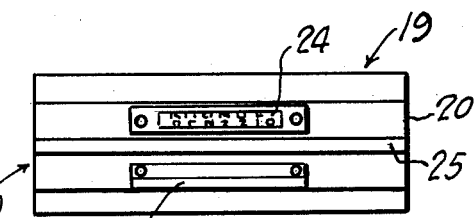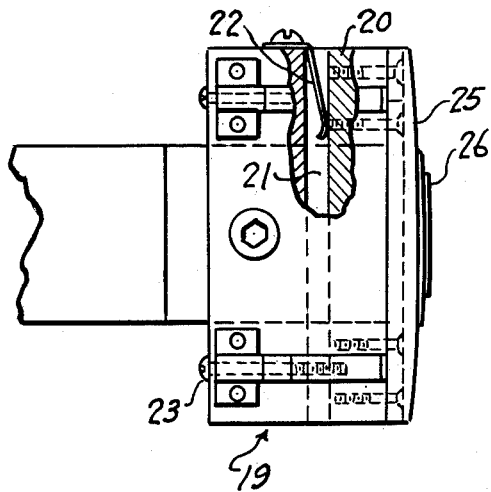

United States Patent Office 2,737,886
Patented Mar. 13, 1956

2,737,886

MEANS FOR INKING A SPARK PLUG INSULATOR OR SIMILAR WARE DECORATING MEANS

Oscar W. Ruppel, Detroit, Mich., assignor to Champion Spark Plug Company, Toledo, Ohio, a corporation of Delaware Application March 2, 1953, Serial No. 339,570

3 Claims. (Cl. 101—351)

This invention relates to a novel and improved means for applying color or designs to solid articles, and particularly to apparatus for printing on or applying a liquid suspended decoration material, colored or otherwise, to the ceramic insulators of spark plugs.

In apparatus of this character, it is extremely difficult to apply color decoration or the like to small wares, such as the ceramic insulators used in spark plugs, in a clear, uniform and non-smudging manner.

The primary object of the invention is the provision of simple, efficient and improved means for applying such decoration in a manner characterized by simplicity, economy and reliability of operation, and by accurate control of thickness and uniformity of the applied decoration, whereby to enhance the appearance and commercial value of small ware of this character so treated.

Further object and advantages of the invention will be apparent from the following detailed description, and from the accompanying drawings illustrating one embodiment thereof, in which—

Fig. 3 is an enlarged section on the line 3—3 in Fig. 2, with parts broken away;

Fig. 4 is an enlarged section on the line 4—4 in Fig. 1;

Fig. 5 is an enlarged elevation of the ink or color applying mechanism in operative relation to the work-carrying wheel, with parts broken away;

Fig. 6 is a section on the line 6—6 in Fig. 5;

Figs. 9 and 10 are enlarged details of a portion of said mechanism showing different positions of the rotor ink applying part thereof from that in Fig. 7;

Fig. 11 is an enlarged detail section on the line 11—11 in Fig. 5, with parts in full;

Fig. 12 is a detail looking in the direction of the arrows on the line marked 12—12 in Fig. 9;

Fig. 13 is an outer face view of the inking head and impression bar, and

Fig. 14 is an enlarged side elevation of the inking head and its impression bar, with a part broken away.

Figure 1:
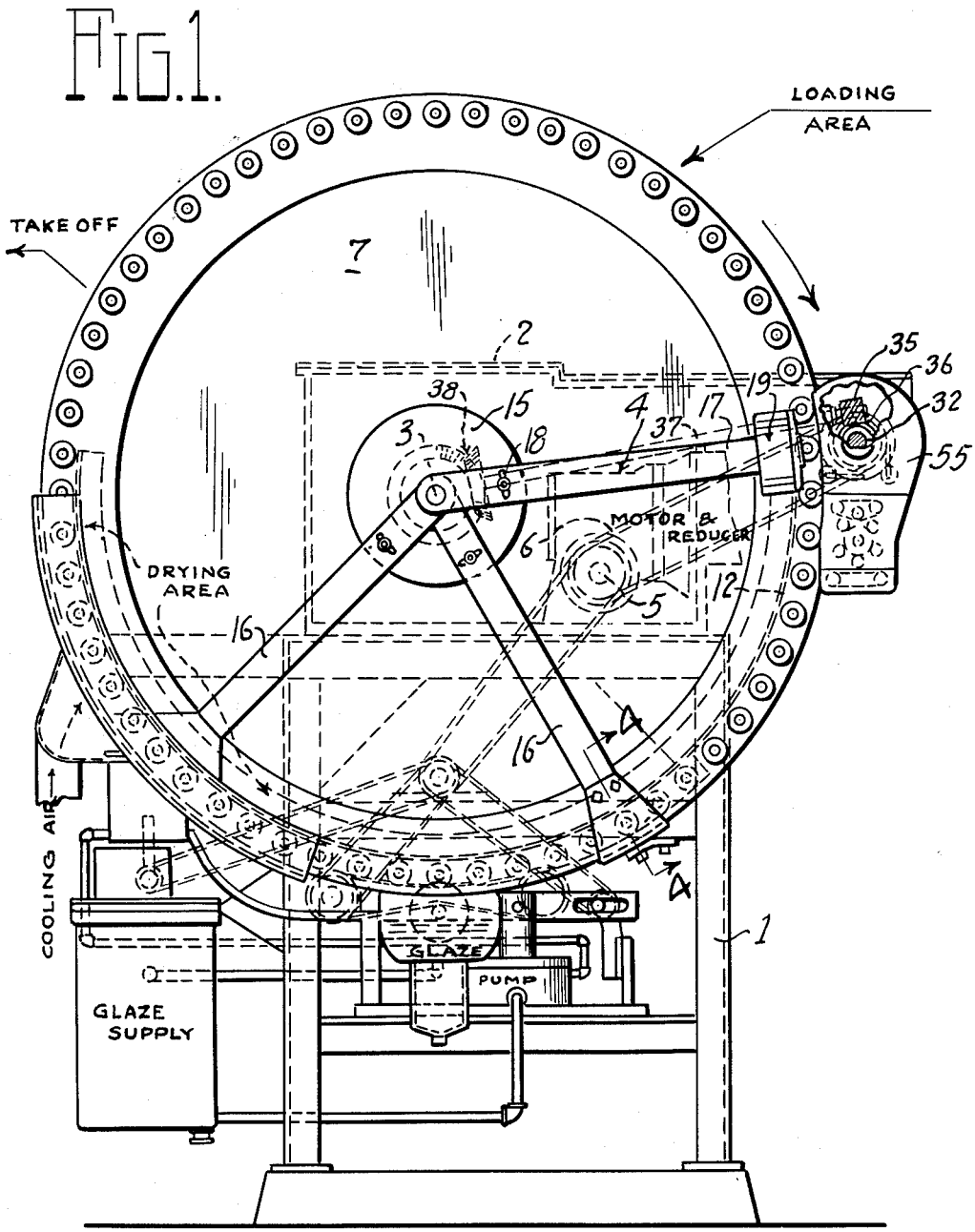
Fig. 1 is a side elevation of the apparatus looking at the face of the work-carrying wheel.

Referring to the drawings, 1 designates the machine frame having a top frame structure 2 adjacent to one side, and in this is journaled a main horizontally disposed shaft 3. This shaft is driven at one end by a motor and speed reduction unit 4 through a shaft 5 and belt-and-pulley or chain-and-sprocket connection 6 (Figs. 1 and 2) to a shaft 32 and a gear train subsequently described. The opposite end of the shaft projects from the structure 2 and carries at such end a large work-carrying wheel 7 that turns in a vertical plane at a side of the frame 1.

The wheel 7, in the present instance, is of disk-form and is provided in its rim portion, adjacent to its periphery, with a set of equidistantly spaced bearing bushings 8 (Fig. 11) concentric to the wheel axis and with their axes parallel thereto. In each bushing is mounted a spindle 9 for free rotary movement therein and each has a roller 10 fixed to its end at the inner side of the wheel. Fixed to and projecting axially from the inside end of each spindle 9 is a pin-like extension 11 on which a work-piece A, indicated in the present instance as the core or ceramic insulator of a spark plug, may be placed.

The pins 11 are horizontally disposed and of suitable size to project into and fit the center electrode receiving opening of a core. The snug fit of a work-piece on the pin causes it to turn therewith. The work-pieces are successively placed on and removed from the spindle pins at respective loading and take-off areas indicated in Fig. 1. Each spindle 9 intermediate these areas is rotated by engagement of its roller 10 with a segmental friction track 12 (Figs. 2 and 11) that is fixedly carried by the machine frame and extends from near the loading zone down to near the lower limit of the down run of the spindle set. As each spindle-carried work-piece traverses through this run, the desired decorating or imprinting takes place.

Imprinting means

Loosely mounted on the shaft 3 at the outer side of the wheel 7 is a disk 15 (Figs. 1 and 2), and this is held stationary or against turning by any suitable means such as divergent frame arms 16, 16 that radiate, in the present instance, from the axis of the shaft 3. A third frame arm 17 projects radially from the outer end of the shaft 3 toward the right hand edge of the wheel 7 (Fig. 1) below the loading area, and is adjustably attached to the disk 15 by a bolt-and-slot connection 18. The arm 17 carries a printing head 19 at its outer end immediately inside the path of movement of the spindle-carried work-piece A, and mounted on this head is a die or type-carrying bar 20 (Figs. 11–14). This bar is mounted in a recess 21 in the head 19 longitudinally to the path of movement of the work-pieces, at the inner side thereof, and is yieldingly pressed outward by spring fingers 22 attached to the head. The extent of such outward movement is limited by stop screws 23 (Fig. 14). The impression plate 24, carrying the type or design to be impressed on a work-piece, is secured to the outer side of the bar 20, in the present instance, adjacent to one side edge thereof, and at one side of this, lengthwise of the bar, is a roller rail 25. Also, in transversely spaced relation to the rail 25 is a second rail 26 with which each work-piece has rolling contact during the taking of an impression. The outer surfaces of the plate 24 and the two rails 25 and 26 are arcuate and concentric to the axis of the work-carrying wheel 7.

Inking means for impression plate

Figure 2:
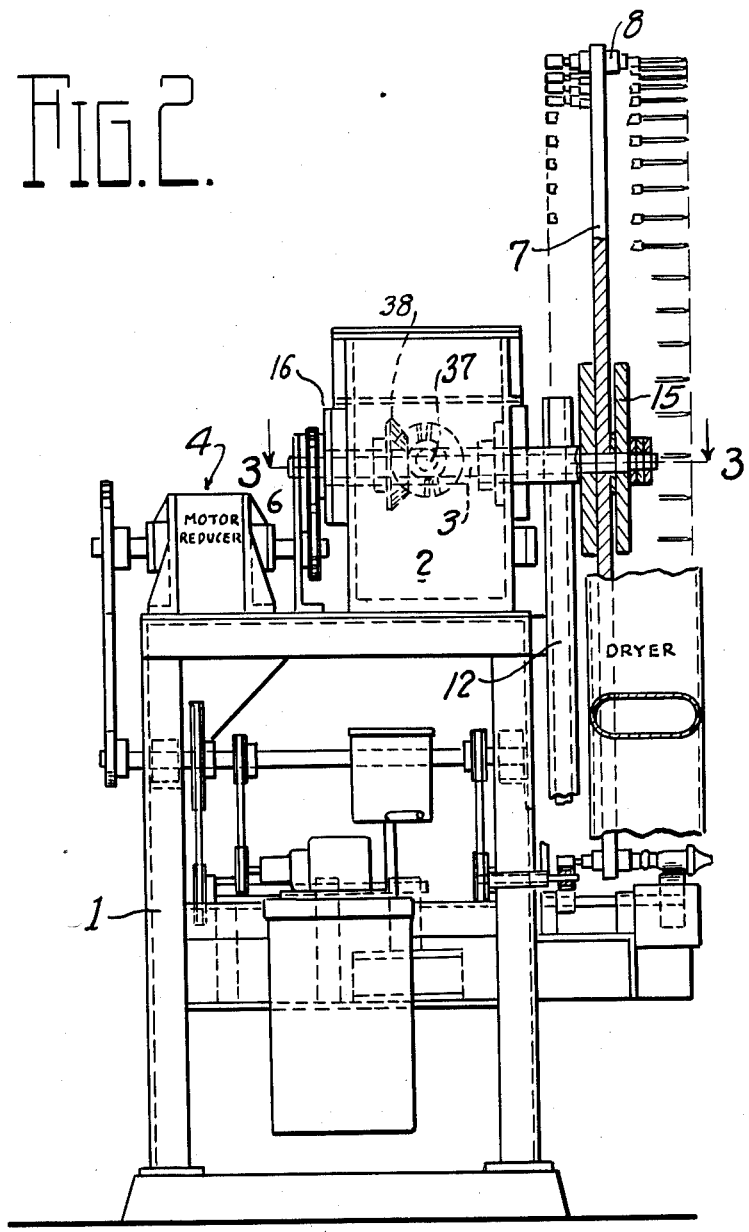
Fig. 2 is a different side elevation thereof looking edgewise of the work-carrying wheel and with parts broken away.

A bearing bracket 30 is mounted, in the present instance, on the motor unit 4 (Figs. 3 and 7) and holds a bearing sleeve 31 in which a shaft 32 is journaled. This sleeve at one end has a flange 33 attached to the side of the frame structure 2, while its opposite end projects beyond the edge of the wheel 7 adjacent to the printing head 19. Shaft 32 carries a rotor 34 radially outward from the wheel and at the outward side of the adjacent path of movement of the spindle pins 11 in opposition to the impression means 19. The shaft 32 extends into the space within the frame 2 and carries a spiral gear 35 in mesh with a companion gear 36 on a shaft 37. The shaft 32 is parallel to the axis of the wheel 7, while the shaft 37 is radial to said axis and connects with the wheel shaft 3 through a pair of bevel gears 38 (Figs. 2 and 3).

The wheel 7 and rotor 34 are, therefore, both driven at uniform speeds from the motor shaft 5.

The rotor 34 is cup-shaped to provide a recess 40 in the outer side thereof and has circumferential radial edge flanges 41 forming a recess 42 therebetween. The rotor 34 (Fig. 7) turns with the shaft 32 and is provided within the recess 40 with a rotary cam 43 that is mounted coaxial with the shaft 32 but free to turn independently. A knob 44 is attached to the cam 43 in outwardly spaced relation thereto, and serves as a means to permit a manual turning of the cam relative to the shaft 32. The cam, in the present instance, has four lands 45 (Figs. 5, 9 and 10) in spaced relation therearound and connected by lobes 46. A series of pins 47 projects radially outward through the rim portion of the drum within the recess 42 and each has a headed inner end riding on the surface of the cam 43. These pins are equidistantly spaced around the axis of the cam and may all be engaged at their inner ends at the same time by the respective lands 45 or by the lobes 46 depending on the rotary position of the cam. The pins are pressed inwardly against the cam by respective coiled springs 47' disposed between the rotor rim and the headed inner end portions of the pins.

A lever 48 is fulcrumed to the rotor flanges 41 within the recess 42 for each pin 47 and has a short arm extending over the respective pin and in engagement therewith through a stud 50 and a long arm carrying at its outer end an inking roll 51. The levers 48 are tangential to the rim of the rotor and when the pins are retracted, as in Fig. 5, the rollers 51 are moved outward to operative inking positions relative to the rotor axis by the pressure of spring fingers 52 against the levers. When the pins 47 are projected outward by a movement of the cam lobes 46 in engagement therewith, as shown in Fig. 10, the levers 48 are actuated to retract the respective rollers 51 to inoperative or non-inking positions, as shown in Fig. 10.

The rotor 34 turns in synchronized relation to the rotation of the work-carrying wheel 7 and at the same peripheral speed so that when the inking rolls 51 are in projected positions, as in Fig. 9, they successively move into successive spaces between adjoining pairs of work-pieces on the wheels 7 and into rolling engagement with the impression member 24 to effect an inking thereof. This action of the inking rolls 51 is indicated in Figs. 5 and 9, as in the former a roll is shown as just entering the space between a pair of work-pieces on the wheel 7 and to move inwardly therewith, while Fig. 9 shows the roll in rolling contact with the impression member. In Fig. 10 the cam 43 is shown as thrown to a position to project the pins 47 which retracts the inking rolls 51 to inoperative positions.

At one side of each inking roll 51 and mounted to turn therewith is a friction disk 53 (Fig. 12) that engages and travels lengthwise of the stationary rail 25 in engagement therewith during an inking of the type or impression piece 24. This gauges or limits the pressure of the roller against the type surface, thus providing for the proper uniform distribution of ink from the roller 51 to such surface.

Figure 7:
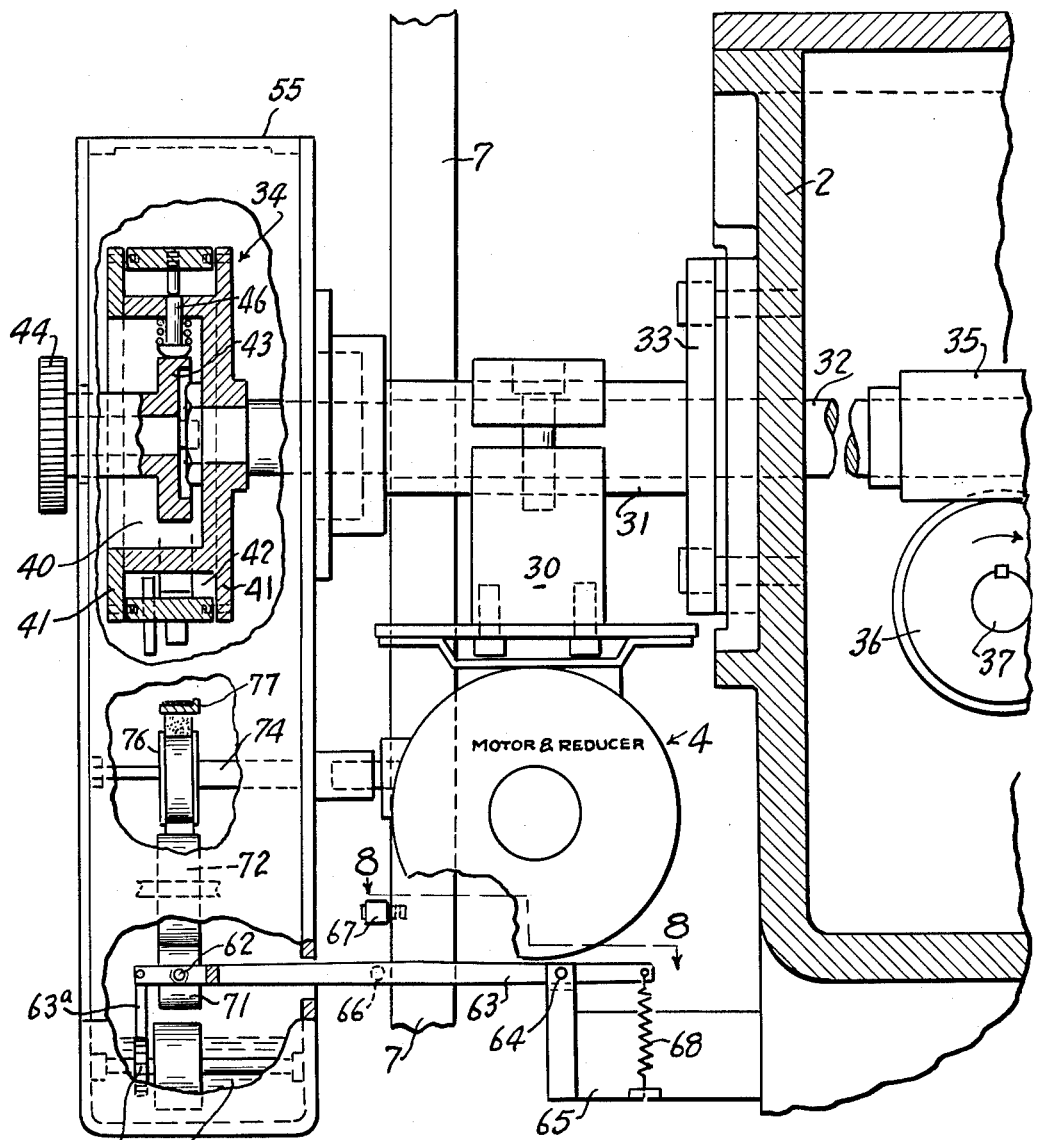
Fig. 7 is an enlarged edge elevation of the color applying mechanism and its mounting and drive parts, with parts broken away and in vertical section.

The rotor 34, except that the side portion thereof through which the rollers 51 are projected into inking engagement with the type element 24, is enclosed in a case 55 that is supported by the outer end of the bearing sleeve 31 (Figs. 3 and 7). This case extends a distance below the rotor 34 and forms at its bottom portion a fount 56 in which ink or liquid color matter to be applied to the surface of the rotor rolls 51 is contained. Within the fount 56 are mounted two horizontally spaced rollers 57 (Fig. 5) connected by a belt 58 the upper run of which is above the level of the ink in the fount while the lower run operates through the ink.

Figure 8:
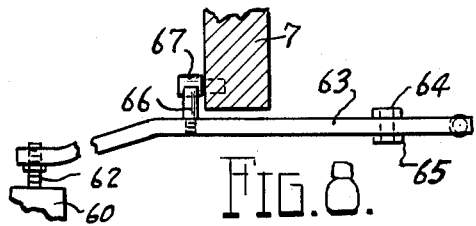
Fig. 8 is a section on the line 8—8 in Fig. 7.

A lever 60 is disposed above the upper run of the belt 58, being fulcrumed at 61 to one side of the case 55 and extending therefrom lengthwise over the belt and is attached, by a pin 62 at its other end, to one end portion of a feed lever 63 (Figs. 5 and 7). This feed lever is fulcrumed at 64 to a bracket extension 65 from the lower portion of the frame structure 2 and has its long arm extending therefrom crosswise of the periphery of the work-carrying wheel 7 adjacent thereto in position for a pin 66 on the lever to be struck and lowered at timed intervals by one or more pins 67 suitably positioned on one side of the wheel 7 adjacent to its rim (Figs. 7 and 8). A spring 68 connects the short arm of the feed lever to the frame part 65 and serves to normally hold the long arm of the lever elevated. A spring pawl 63a projects down from the operating end of the lever 63 and engages a ratchet wheel 69 on a shaft carrying one of the rolls 57, whereby a slight feeding movement is imparted to the inking belt 58 at each down stroke of the lever.

The lever 60 has an opening 70 therein (Fig. 6) and in this is mounted a roll 71 which engages the top run of the inking belt 58 at each downward stroke of the lever. By this action a small amount of ink is applied to the periphery of the roll at each operation.

When the roll 71 is elevated, it peripherally contacts and rolls on an idler distributing roll 72 mounted above it in the case 55, and this roll is engaged, in the present instance, by a set of four small idler rolls 73 mounted around its periphery in the case. The two upper idler rolls 73 are disposed to transfer ink from the rolls 72 to the under side of the lower run of an ink distributing belt 75 at each side of a drive pulley 76 for the belt. This belt has an upper run passing over a stationary plate 77 between two guide rolls 78. The shaft 79 on which the drive pulley 76 is mounted has connection with and is driven by the power unit 4 (Fig. 7). By the time the ink is transferred from the belt 58 to the trip or oscillating roll 71, thence to the large idler roll 72 on which it is distributed by idlers 73, and then finally from the two upper idler rolls 73 to the belt 75, it is apparent that the ink has a uniform distribution on such belt. While a specific ink distributing mechanism has been described, any equivalent grouping of spreading rollers and belts may be substituted therefore, so long as uniform ink distribution is obtained.

The platform supported upper run of the belt 75 is located below the rotor 34 in position for the rolls 51, when projected and as they pass through the lower arc of their movements, to engage and roll for a short distance on the belt 75 to pick up ink therefrom. Thus, the ink is transferred in a smooth uniform manner from the belt to the applying rolls 51 and by them to the impression element 24 for an imprinting of each work-piece as it is brought into position by the wheel 7 and rolls over the type of the impression member.

After an imprinting or decorating operation, each work-piece continues its movement with the wheel 7 and passes through a glazing and drying zone at the lower portion of the wheel and before reaching the take-off position. A means for accomplishing this is partially shown in the lower portion of Figs. 1 and 2, but inasmuch as it forms no part of the present invention it is not claimed herein and, therefore, is not further shown and described.

In the operation of the machine, work-pieces A are attached to the spindles 9 in any suitable manner, and in the case of spark plug insulators or the like having openings therein, the spindle ends are equipped with pins 11 for the purpose and these are inserted into the article passages as illustrated in Fig. 11. The spindles and work-pieces are each rotated after leaving the loading zone and while passing through the imprinting or ink-applying zone, by reason of a roller 10 on each spindle traveling in rolling engagement with a friction track 12.

The inking rolls 51 of the rotor 34 revolve in synchronized relation to the rotation of the work-carrying wheel 7, and the successive rolls 51 pass between the successive pairs of work-pieces A, so that a die plate is first inked by one of such rolls and a work-piece is then rolled across the plate to receive an impression therefrom. The ink or coloring is uniformly applied to the die plate due to the improved manner of distribution thereof and is consequently applied in a like manner to the work. Such turning movement prior to and during inking is necessary to prevent a wiping action of the type and a build up of ink on the leading face of the letters. Should the wheel 7 for any reason be kept running without applying work-pieces thereto, the operator may turn the control knob 44 of the inking mechanism and effect retraction of the inking rolls 51 so that while continuing to revolve with the rotor they will not have engagement with the die plate 24. If this precaution were not taken, ink would build up on the die plate and cause smearing of a number of work-pieces by reason of the transfer of an excessive quantity of ink thereto.

While it is apparent that the imprinting means described may be employed for imprinting names and other data on spark plugs or the like, it will be understood that it may be used to apply colored lines or other decorations to the work-pieces and that, therefore, when ink is referred to herein it includes coloring matter as well.

I wish it understood that my invention is not limited to any specific construction, arrangement or form of the parts, as it is capable of numerous modifications and changes without departing from the spirit of the claims.

Having thus described my invention, what I claim as new, and desire to secure by United States Letters Patent, is:

1. In a machine of the class described having an imprinting means and means for rolling successive articles thereover to receive impressions therefrom, the provision of means for inking the imprinting means before each impression, said inking means comprising a rotor, driving means for the rotor, a plurality of levers fulcrumed to the peripheral portion of the rotor in tangential relation thereto and in predetermined circumferentially spaced order therearound, an inking roll carried by each lever at one end thereof and trailing the movement of the rotor, means yieldingly acting on each lever to urge its rolls outward from the rotor to imprinting means engaging position, and means coaxial with the rotor and manually operable to move the levers in unison to retract the rolls from said outward position and to hold the rolls in such retracted positions during rotation of the rotor.

2. In a machine of the class described having an imprinting means and means for rolling successive articles thereover to receive impressions therefrom, the provision of means for inking the imprinting means before each impression, said means comprising a rotor having an annular peripheral radial flange and an annular drum flange, a plurality of levers fulcrumed to the radial flange in tangential relation thereto and in predetermined circumferentially spaced order therearound, an inking roll carried by each lever at one end thereof, means yieldingly acting on each lever to urge its roll outward from the rotor to imprinting means engaging position, and means carried within the rotor coaxial therewith and manually operable through said drum flange to actuate each lever to move its roll inward to inoperative position and to retain it in such position during rotation of the rotor.

3. In a machine of the class described having an imprinting means and means for rolling successive articles thereover to receive impressions therefrom, the provision of means for inking the imprinting means before each impression, said inking means comprising a drum-like rotor, means for driving said rotor, a plurality of levers fulcrumed to said rotor in tangential relation for radial rocking movements relative thereto and disposed in predetermined circumferentially spaced order therearound, an inking roll carried by each lever at one end thereof, means yieldingly acting on each lever to urge its roll outward from the rotor to imprinting means engaging position, a normally stationary cam manually turnable within the rotor, and means actuated by a turning of the cam and projecting through the peripheral portion of the rotor to move each lever to retract its roll from imprinting means engaging position upon a predetermined turning of the cam relative to the rotor.

References Cited in the file of this patent

UNITED STATES PATENTS

| | | |
|---|---|---|
| 13,376 | Melville et al. | Aug. 7, 1855 |
| 988,603 | Treiber | Apr. 4, 1911 |
| 1,197,825 | Hoe | Sept. 12, 1916 |
| 1,683,243 | Blaine | Sept. 4, 1928 |
| 1,717,737 | Schlesinger | June 18, 1929 |
| 2,194,324 | Putnam et al. | Mar. 19, 1940 |
| 2,278,652 | Gammeter | Apr. 7, 1942 |
| 2,442,948 | Bogoslowsky | June 8, 1948 |